United States Patent
Everett et al.

(10) Patent No.: US 7,566,383 B2
(45) Date of Patent: Jul. 28, 2009

(54) HEAT RECOVERY FROM A BIOMASS HEAT SOURCE

(75) Inventors: Rollo J. Everett, Worth, IL (US); Nathan S. Mosier, West Lafayette, IN (US); Jerry L. Weiland, Morton, IL (US); Gary Welch, Peoria, IL (US); Michael R. Ladisch, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 649 days.

(21) Appl. No.: 11/156,242

(22) Filed: Jun. 17, 2005

(65) Prior Publication Data

US 2006/0286628 A1    Dec. 21, 2006

(51) Int. Cl.
*B01D 5/00* (2006.01)
*C12P 7/06* (2006.01)

(52) U.S. Cl. .......... 203/88; 159/2.3; 159/47.3; 159/DIG. 22; 159/DIG. 23; 159/DIG. 8; 202/185.2; 203/DIG. 8; 210/774; 435/162; 426/476

(58) Field of Classification Search .......... 62/171, 62/183, 304; 95/17, 288; 159/2.1, 2.3, 47.3, 159/901, DIG. 8, DIG. 22, DIG. 23; 202/185.2; 203/88, DIG. 8; 210/774; 435/161, 162; 426/476

See application file for complete search history.

(56) References Cited

U.S. PATENT DOCUMENTS

| | | | | |
|---|---|---|---|---|
| 2,329,727 A | * | 9/1943 | Rosenblad | 165/297 |
| 3,463,216 A | * | 8/1969 | Miles | 159/47.3 |
| 4,755,258 A | * | 7/1988 | Ryham | 159/47.3 |
| 5,135,861 A | * | 8/1992 | Pavilon | 435/162 |
| 5,171,592 A | * | 12/1992 | Holtzapple et al. | 426/69 |
| 5,846,787 A | | 12/1998 | Ladisch et al. | |
| 2002/0108739 A1 | * | 8/2002 | Cheng et al. | 165/47 |
| 2004/0030161 A1 | * | 2/2004 | Bhatia | 549/463 |
| 2004/0110994 A1 | * | 6/2004 | Bhatia | 568/845 |
| 2009/0077892 A1 | * | 3/2009 | Shulenberger et al. | 48/62 R |

OTHER PUBLICATIONS

M. Ladisch et al., *Building a Bridge to the Ethanol Industry—Follow-up Project*, Subcontractor Report Feb. 22, 2001-Dec. 31, 2002, pp. i-31 and Report Documentation Page (Apr. 2003).

Nathan S. Mosier et al., *Industrial Scale-Up of pH Controlled Liquid Hot Water Pretreatment Of Corn Fiber for Fuel Ethanol Production*, for submission to Applied Biochemistry and Biotechnology, pp. 1-36 (Jul. 27, 2004).

* cited by examiner

*Primary Examiner*—Virginia Manoharan
(74) *Attorney, Agent, or Firm*—Brinks Hofer Gilson & Lione

(57) ABSTRACT

A method and system for recovering heat from a pretreated hot biomass stream is described. The method and system for heat recovery includes a flash cooler connected to a direct contact condenser. A liquid portion of the hot biomass stream flashes into vapors upon the hot biomass stream entering the flash cooler. The flashed vapors are transferred to the direct contact condenser. The flashed vapors and an incoming cold biomass stream subsequently come into contact with each other in the direct contact condenser, thereby causing heat to be transferred from the hot biomass stream to the cold biomass stream. As the heat transfer occurs, the flashed vapors condense onto the surface of the cold biomass.

22 Claims, 4 Drawing Sheets

HEAT RECOVERY FROM A BIOMASS HEAT SOURCE

TECHNICAL FIELD

The present invention relates to methods for recovering heat from a pretreated biomass stream.

BACKGROUND

The pretreatment of cellulosic materials is an energy intensive process in which a liquid suspension of the cellulosic materials is pressurized and heated under controlled pH conditions. The pretreatment process enables glucans, xylans and other oligosaccharides to be removed from the cellulosic fiber and solubilzed within the liquid. The solubilized glucans, xylans, and other oligosaccharides may be enzymatically hydrolyzed to glucose and other monosaccharides in post processing steps and, thereafter, fermented to ethanol, amino acids, enzymes, and other bioproducts which are used as fuels or oxygenated chemicals that are growing in demand.

Economic feasibility of the process requires operating costs to be maintained at reasonable levels. Thus, the high energy associated with the pretreated cellulose must be recovered. Traditionally, heat exchangers have been employed to recover the high energy. However, heat exchangers, such as shell-and-tube heat, spiral heat exchangers, and plate and frame heat exchangers are relatively costly, raise several operating parameter concerns that must be controlled, and in some cases do not operate properly at high slurry concentrations. Cellulosic slurries on the cool side of such heat exchangers have not yet undergone pretreatment. As a result, their apparent viscosity may exceed 10,000 cp, which is difficult to pump. Furthermore, large pressure drops across the tubes and scaling in the tubes are other examples of common operating problems posed by shell-and-tube heat exchangers that must be controlled in order to achieve sufficient heat recovery. Moreover, the required high cellulosic slurry loading, defined as weight per unit volume, at the inlet of the heat exchanger, poses additional slurry handling problems conventional heat exchangers are not well-equipped to handle. Failure to control such operating parameters will lead to inefficient heat recovery and lower process yields. Inefficient heat recovery will make the energy costs of the process too high, thereby resulting in economic unfeasibility of the pretreatment process.

Heat exchangers also pose maintenance concerns. Heat exchangers contain heat transfer surfaces that foul, thereby requiring regular cleaning of the fouled surfaces. Such cleaning often consists of chemical cleaning systems. Additionally, the downtime produced from cleaning the heat exchangers necessitates expensive back-up heat exchange equipment, which can increase operating costs in a continuously operating plant.

Heat exchangers traditionally require a cooling working fluid, such as cooling water, on the shell side. The requirement for a cooling working fluid adds additional costs to the process. The cooling working fluid also does not effectively regenerate heat energy to other process fluids within the pretreatment process.

Thus, there is an unmet need for improved heat recovery from a high slurry stream in which the captured heat may be directly exchanged between an incoming and out-going slurry stream to thereby function as a recuperative heat exchange device. The improved heat recovery should efficiently handle the high slurry stream while being relatively inexpensive compared to other processing steps. The improved heat recovery also should be simple to operate, having minimal operating parameters to monitor and control.

SUMMARY

A method for recovering heat from a hot biomass stream is provided. The method includes providing a flash cooler and a direct contact condenser. A hot biomass may be fed into the flash cooler. Upon entering the flash cooler, a portion of the liquid flash vaporizes. The flashed vapor exits the flash cooler and enters the direct contact condenser. Cold biomass may be concurrently fed into the direct contact condenser. The flashed vapor contacts the cold biomass causing heat transfer to occur from the flashed vapor to the cold biomass. Absorption of the heat by the cold biomass condenses the vapor onto the surface of the cold biomass.

A method for further recovery of heat from a hot biomass stream also is provided. A first flash cooler-direct contact condenser unit may be used to remove heat energy from a hot biomass stream. The heat energy removed may be transferred to the first direct contact condenser to heat incoming slurry. A second flash cooler-direct contact condenser unit may provide additional heat recovery from the hot biomass stream. Heat energy removed by the second flash cooler may be transferred to the second direct contact condenser where incoming slurry are preheated.

A multi-staged flash cooler-direct contact condenser heat recovery system for incremental transfer of heat is provided. The multi-staged heat recovery system may include at least three flash coolers configured in series and at least three direct contact condensers configured in series. Each flash cooler may be connected to a corresponding direct contact condenser. A cold biomass stream may be successively passed through the series of direct contact condensers. A hot biomass stream may be successively passed through the series of flash coolers. A portion of liquid of the hot biomass flashes into a vapor in each of the flash coolers that the hot biomass stream passes through. The flashed vapors may be transferred from the flash coolers to the corresponding direct contact condensers. In each of the corresponding direct contact condensers, the flashed vapors and the cold biomass stream come into contact. The contact causes the flashed vapors to condense onto the surface of the cold biomass stream, thereby heating the cold biomass stream.

DETAILED DESCRIPTION

Figure 1:
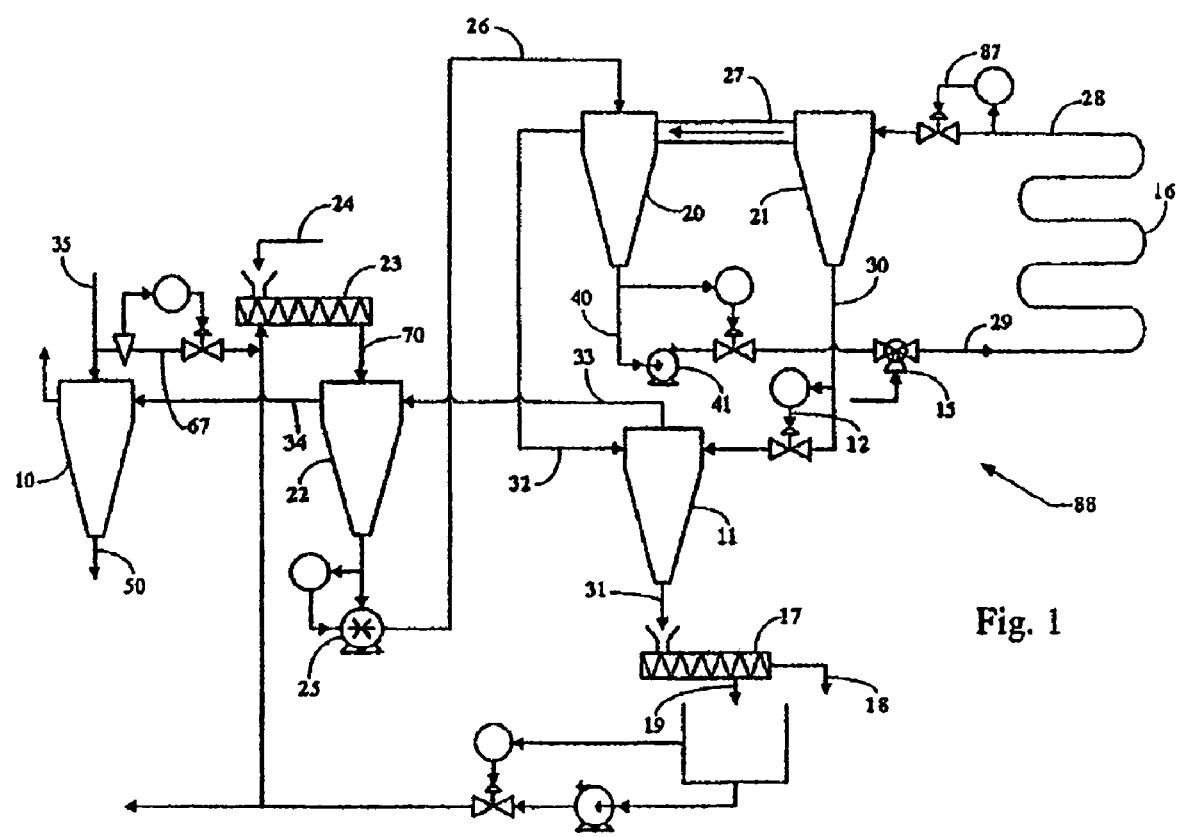
FIG. 1 is a process flow diagram of the heat recovery system of the present invention integrated into the pretreatment process of corn fiber.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings. It should also be understood that the drawings are not to scale and in certain instances details have been omitted, which are not necessary for an understanding of the present invention, such as conventional details of fabrication and assembly.

Pretreatment of corn fiber is a high energy process by which corn fiber is converted to a liquid having dissolved oligosaccharide sugars. Specific processes for pretreating cellulosic material, as defined herein, are described in U.S. Pat. No. 5,846,787 issued to Ladisch et al., which is incorporated herein by reference. Dissolved oligosaccharide sugars which have been generated from the pretreatment process can subsequently be enzymatically hydrolyzed and, thereafter, fermented to ethanol. Large amounts of energy can be required to generate such soluble oligosaccharide sugars from the corn fiber, and an efficient heat recovery system is particularly desirable to make the pretreatment process more energy efficient and more economically favorable.

Heating during pretreatment may be required for extracting and solubilizing sugars of the corn fiber. Subsequent cooling of the sugars and addition of an appropriate microorganism, such as yeast or an ethanol fermenting bacterium, may enable fermentation to occur. Transitioning from the pretreatment phase to the fermentation phase often involves dissipating heat energy. Accordingly, described herein are processes and systems for recovering such dissipated heat energy by utilizing a hot pretreated biomass stream to heat a cold unpretreated biomass stream, such as a biomass stream that enters a pretreatment process.

All operating parameters (e.g., temperature, pressure, composition, concentration) described herein are based on calculated values from an energy balance using Microsoft® Excel or expected values utilizing a heat recovery process based on a conventional heat exchanger configuration.

A hot biomass as used herein refers to a biomass having a temperature at a corresponding pressure greater than a temperature of a cold biomass stream at a corresponding pressure. The illustrative embodiments are described with reference to a cellulosic material, preferably corn stover or corn fiber derived from the processing of corn grain, and under some conditions, corn grain itself. However, the particular cellulosic material employed in the present invention is not critical but, rather, merely serves as an illustration for understanding the operation of the present heat recovery systems and methods relating to the same.

The term "flashing" as will be used herein refers to liquid vaporizing at a certain temperature as a result of the saturation vapor pressure of the liquid being greater than the ambient pressure the liquid is exposed to.

Preferred embodiments of the present invention provide for the transfer of heat from flashed vapors of a hot pretreated biomass to a cold biomass. An example of such an embodiment is shown in FIG. 1. The heat recovery process 88 as shown in FIG. 1 uses a flash cooler 21 and direct contact condenser 20. Flashed vapors are generated in flash cooler 21 and provide the heat source for heating a cold biomass 26. Preferably, the pressure of the flash cooler 21 is maintained below the vapor pressure of the hot biomass stream to facilitate vaporization of a portion of the hot biomass stream. The flashed vapors exiting flash cooler 21 are preferably at a higher temperature than the temperature of the cold biomass entering direct contact condenser 20. Flash cooler 21 and direct contact condenser 20 are connected to enable the flashed vapors from the flash cooler 21 to directly contact the cold biomass within direct contact condenser 20. Direct contact between the flashed vapors from the flash cooler 21 (the flashed hot biomass vapor) and the cold biomass can provide transfer of heat energy from the hot biomass stream to the cold biomass, for example, by condensation of the flashed hot biomass vapor on a cold biomass stream.

Operation of the heat recovery process 88 of FIG. 1 will now be described in detail. Operating parameters of FIG. 1, as will be discussed, are based on expected values utilizing a heat recovery process based on a conventional heat exchanger configuration. In some embodiments, a series of multiple connected flash coolers and direct contact condensers can be utilized to increase the portion of recovered heat energy from the hot biomass stream. Heat recovery process 88 illustrates the use of two flash cooler-direct contact condenser units. Flash cooler 21 is connected with direct contact condenser 20, and flash cooler 11 is connected to direct contact condenser 22. Heat energy may be recovered from each flash cooler-direct contact condenser unit.

An exemplary process of producing flashed vapors in flash cooler 21 from the pretreated corn fiber stream will now be discussed with reference to FIG. 1. Pretreated corn fiber stream forms a hot biomass stream 28 that exits from pretreatment reactor coil 16 as a high energy liquefied slurry. The hot biomass stream 28 can be provided as an output from a previous pretreatment process. The pretreatment process preferably provides for the extraction of one or more desirable materials from the hot biomass stream such as oligosaccharides. The temperature and pressure of the hot biomass stream can be typical of a pretreated biomass stream obtained from a pretreatment process, such as extraction of oligosaccharides. One skilled in the art can determine suitable ranges of temperatures and pressures appropriate for any desired pretreatment process, such as an extraction process. A variety of factors can be considered in determining suitable temperatures and pressures for the hot biomass stream, including pressure drop across the pretreatment reactor coil 16, the initial temperature of the biomass, and the type of biomass being pretreated and extracted. Pressure and temperatures of hot biomass stream 28 are typically greater than atmospheric pressure and room temperature, often greater than 25 psig and 212° F. In this example, hot biomass stream 28 comprises pretreated corn fiber and has a temperature of about 320° F. and a pressure of about 75 psig. Pressure control valve 87 maintains the operating pressure of pretreatment reactor coil 16 at the set point pressure of about 75-85 psig. Referring to the embodiment of FIG. 1, the viscosity of pretreated corn fiber hot biomass stream 28 is lower than untreated corn fiber, allowing the pretreated corn fiber stream hot biomass stream 28 to be transported and handled effectively. In particular, pretreated corn fiber hot biomass stream 28 flows into flash cooler 21. Flash cooler 21 operates at a reduced pressure from the pretreatment reactor coil 16 pressure of 75-85 psig, but is well above atmospheric pressure. For this particular example, typical operating pressures of flash cooler 21 may be in the range of 25-30 psig based on the thermal balance of the system. Because the operating pressures of flash cooler 21 are well below the saturation water vapor pressure at the temperature of about 320° F. in the embodiment illustrated in FIG. 1, a liquid portion of pretreated corn fiber hot biomass stream 28 flash vaporizes as it enters flash cooler 21 in response to the reduced operating pressure maintained in flash cooler 21. The flashed vapors stream 27 thermally equilibrate with the liquid slurry stream 30, and exit flash cooler 21 as stream 27 at about 263° F.

The flashing must be done under pressure so that flashing of the aldehydes that may form as a consequence of the hydrolytic action is minimized. Removal of the aldehydes may favor the formation of undesirable sugar degradation products, thereby introducing such undesirable products into the product stream. These products may reduce the yield of sugars, but more importantly, inhibit the ethanol fermentation or other fermentations carried out downstream of the pretreatment process. Thus, at higher temperatures, where degradation reactions are likely to occur at a high rate, reducing pressure in a step wise manner, as will be discussed below in further detail, may minimize rapid loss of aldehydes.

After formation of flashed vapor stream 27, the next heat recovery step involves contacting the flashed vapor stream 27 with the cold untreated corn fiber stream 26. Flashed vapor stream 27 exits flash cooler 21 and enters direct contact condenser 20. The vapors of stream 27 function as the heat transfer medium to heat the cooler incoming untreated corn fiber slurry stream 26, which is a mixture of corn fiber and stillage. Stillage is a hot liquid aqueous stream that contains unfermented dissolved sugars, lipids, proteins, and other non-volatile components that remain after the distillation process. Solids content of the untreated slurry can be provided as an output from prior upstream processing. The solids content of the stillage can be typical of such an upstream process. One skilled in the art can determine suitable ranges of solids content in the untreated slurry indicative of the process. A variety of factors can be considered in determining a suitable solids content of the stillage, including the composition of the stillage, the concentration of non-volatile components in the stillage, the concentration of unfermented dissolved sugars, and the ratio of stillage to fiber mixed in conveyor 23. This particular example is based on a solids content of the untreated slurry at about 160 g fiber per liter of stillage.

As streams 26 and 27 enter the direct contact condenser 20, flashed vapors of stream 27 contact the surface of untreated corn fiber slurry stream 26. Upon contact in the direct contact condenser 20, flashed vapors condense onto the surface of untreated corn fiber slurry stream 26. Untreated incoming corn fiber slurry stream 26 can be provided as an output from previous upstream processing. The upstream processing is preferably providing for the preheating of untreated corn fiber slurry stream 70 in direct contact condenser 22 to reduce its viscosity and improve its transport properties. The temperature of the untreated corn fiber slurry stream 26 can be typical of such an untreated corn fiber slurry stream 70 being preheated upstream. A variety of factors can be considered in determining suitable temperatures for such an untreated corn fiber slurry stream 70, including its initial viscosity, the difficulty in transporting the untreated slurry, and the composition of the slurry. Temperatures of untreated slurry stream 70 are typically greater than ambient temperature, often greater than 100° F. In this example, untreated corn fiber slurry stream 26 has a temperature of about 210° F. Accordingly, the absorption of the latent heat of the condensed vapors 33 by untreated slurry 70 causes the temperature of the untreated corn fiber slurry stream 26 to increase from about 210° F. to about 263° F. Countercurrent flows of flashed vapor stream 27 and untreated corn fiber slurry stream 26 ensure sufficient contact of flashed vapors with the incoming slurry, thereby allowing heat transfer from stream 27 to untreated slurry stream 26. Thus, flash cooler 21 and corresponding direct contact condenser 20 enable a first portion of heat energy inputted into heat recovery process 88 to be recovered.

In some embodiments, a series of multiple connected flash coolers and direct contact condensers can be utilized to increase the portion of recovered heat energy from the hot biomass stream. Further heat energy may be extracted from nonflashed liquid stream 30. The pressurized flash cooler 21 may cause nonflashed liquid stream 30 to discharge from the bottom of flash cooler 21 as stream 30. Although the flashed vapors have taken a corresponding amount of latent heat with it to cool the remaining nonflashed liquid from about 320° F. to about 263° F., the product may be further cooled to eliminate steaming and further increase heat recovery. Accordingly, stream 30 discharges from flash cooler 21 and enters flash cooler 11 by vapor outlet 33 being open to the atmosphere. Upon entering flash cooler 11, a portion of liquid from stream 30 flashes into vapor in response to the lower pressure maintained in flash cooler 11 by vapor outlet being open to the atmosphere. A pressure seal is maintained by level control system 12. The flashed vapors thermally equilibrate with the nonflashed liquid and exit flash cooler 11 at about 212° F. The vapors subsequently enter corresponding direct contact condenser 22 as stream 33 at about 212° F.

After formation of flashed vapor stream 33, flashed vapor stream 33 is contacted with the cold untreated corn fiber stream 70 in direct contact condenser 22. As vapor stream 33 enters direct contact condenser 22, the vapor stream 33 diffuses and expands within the inner space of direct contact condenser 22. As the vapor stream 33 diffuses and expands within direct contact condenser 22, vapor stream 33 contacts incoming corn fiber slurry stream 70, which is preferably a low moisture material of untreated corn fiber and dilute stillage that is gravity dropped from conveyor 23 into direct contact condenser 22. Upon contact, vapor stream 33 condenses onto the surface of incoming slurry stream 70, thereby preheating incoming slurry stream 70. The absorption of the latent heat of the condensed vapors by incoming slurry stream 70 may cause its temperature to increase to about 210° F. Countercurrent flow of vapor stream 33 and incoming slurry stream 70 ensures sufficient contact of the two streams, thereby enabling heat transfer from vapor stream 33 to incoming slurry stream 70 and further heat recovery in heat recovery process 88.

The heating of incoming slurry stream 70 may alter the slurry handling properties such that they become easier to transport. The slurry stream 26 exiting direct contact condenser 22 may now be pressurized and transported downstream with pulp pump 25. The pump 25 may be a positive displacement type pump, a centrifugal type pump, or other suitable conveying device capable of handling a high solids slurry. Thus, utilizing flash cooler 11 and corresponding direct contact condenser 22 enables a further portion of heat energy inputted into heat recovery process 88 to be recovered.

Stand-alone direct contact condenser 10 provides for further recovery of any remaining heat energy inputted during the heat recovery process 88. Because the energy associated with vapor stream 33 at about 212° F. is sufficient to preheat the slurry coming into direct contact condenser 22, any uncondensed vapor from vapor stream 33 preferably is recovered. Thus, any remaining uncondensed vapor may be transferred directly to a stand-alone direct contact condenser 10 as stream 34. The heat associated with stream 34 may be captured by an incoming dilute stillage stream 35. Dilute stillage stream 35, coming from another previous processs, may flow into stand-alone direct contact condenser 10. As dilute stillage stream 35 enters stand-alone direct contact condenser 10, the heat energy associated with vapor stream 34 may be absorbed by the stillage and water. The heated dilute stillage exits stand-alone direct contact condenser 10 as stream 50, and may be directed downstream for further processing of excess stillage which is not part of this patent.

The vapors exiting from stand-alone direct contact condenser 10 may contain acetic acid, aldehydes and other volatile organics that can further inhibit the fermentation. Their removal will reduce the load on downstream conditioning steps that may be needed to remove aldehydes or organic acids from the hydrolysate that is ultimately obtained from the pretreated material. The vapors containing these components can be condensed using standard heat exchangers (not shown in FIG. 1).

Table 1 provides expected temperatures of slurry stream 26 entering direct contact condenser 20 and flashed vapor stream 27 entering direct contact condenser 20 on the basis of a range of temperatures of incoming slurry stream 70 and pretreated corn fiber stream 28. The expected temperatures were calculated from a thermal energy balance of the process using Microsoft® Excel. All streams in Table 1 refer to those streams designated in FIG. 1. The temperature profile of heat recovery process 88 currently being described is shown below under Fiber Conditions. However, it should be understood that the heat recovery process encompasses a wide range of temperature profiles. Additionally, the temperature profile may apply to not only the corn fiber heat recovery process 88 currently being discussed, but also a variety of other lignocellulosic and fiber containing materials.

TABLE 1

TEMPERATURE PROFILE OF THE HEAT RECOVERY
FROM A PRETREATED BIOMASS SYSTEM
Coil Temp of
Stream 28

|  | 248 F. | 284 F. | 320 F. | 356 F. | 392 F. |
| --- | --- | --- | --- | --- | --- |
| Supply Temp Stream 70, F. 68 F. | | | | | |
| Stream [#26] Temp, F. = | 135 | 147 | 162 | 178 | 194 |
| Stream [#27] Temp, F. = 104 F. | 198 | 219 | 246 | 273 | 302 |
| Stream [#26] Temp, F. = | 154 | 169 | 183 | 198 | 212 |
| Stream [#27] Temp, F. = 140 F. | 201 | 228 | 255 | 282 | 309 |
| Stream [#26] Temp, F. = | 176 | 190 | 203 | 212 | 212 |
| Stream [#27] Temp, F. = Fiber Conditions 163.5 F. | 212 | 239 | 264 | 288 | 309 |
| Stream [#26] Temp, F. = | | | 212 | | |
| Stream [#27] Temp, F. = 176 F. | | | 268 | | |
| Stream [#26] Temp, F. = | 199 | 212 | 212 | 212 | 212 |
| Stream [#27] Temp, F. = 212 F. | 223 | 248 | 268 | 288 | 309 |
| Stream [#26] Temp, F. = | 212 | 212 | 212 | 212 | 100 |
| Stream [#27] Temp, F. = | 230 | 248 | 268 | 288 | 309 |

CALCULATED VALUES BASED ON ENERGY BALANCE

Referring back to flash cooler 11 in FIG. 1, unflashed liquid stream 31 may discharge from the bottom of flash cooler 11 at about 212° F., and be fed to centrifuge 17. Centrifuge 17 separates the suspended solid particles from the liquid. Stream 18 exits centrifuge 17 as a solid cake product at about 212° F. Solid cake product may be used for animal feed. Stream 19 exits centrifuge 17 as a liquid product at about 212° F. and atmospheric pressure. The liquid product may contain dissolved glucans and xylans, and possibly other soluble oligosaccharides, which may be enzymatically hydrolyzed to glucose, xylose, and other monosaccharides depending on the composition of the oligosaccharides, and thereafter be fermented to ethanol with the use of a suitable microorganism.

At this stage of process 88, heat energy released by the cooling of pretreated slurry hot biomass stream 28 stream from about 320° F. to a liquid product stream 19 at about 212°

F. has been recovered by heating untreated corn fiber slurry stream 26 up to about 263° F. The remaining heat required to raise the temperature of untreated corn fiber slurry stream to about 320° F., which is the required temperature prior to entering pretreatment reactor coil 16, is supplied by typical heating equipment known in the art, such as shell and tube heat exchangers, or direct injection of steam. For example, referring back to direct contact condenser 20 in FIG. 1, after incoming untreated slurry stream 26 has been heated from about 210° F. to about 263° F., the untreated slurry exits direct contact condenser as slurry stream 40 towards the inlet of pulp pump 41. Pulp pump 41 pressurizes and transports untreated slurry stream 40 towards injection heater which elevates slurry stream 40 to its final temperature of about 320° F. prior to entering inlet 29 of pretreatment reactor coil 16.

Any unused heat, provided by direct injection 15 to elevate slurry stream 40 to a final temperature of about 320° F. may be recaptured when heating dilute stillage stream 35 in stand-alone direct contact condenser 10. In general, any unused heat that was inputted into heat recovery process 88 may be recovered through use of stand-alone direct contact condenser 10.

Heat recovery process 88 is protected against energy losses due to flashing by using pressure control valves to pressurize a majority of the heat recovery process 88 above the saturation water vapor pressure. The process is designed to not incur flashing at inlet 29 of pretreatment reactor coil 16 by operating at about 85 psig, which is at least about 10 psig above the saturation vapor pressure of water corresponding to the inlet temperature of about 320° F. Because pulp pump 41 must overcome the pretreatment reactor coil 16 inlet pressure of 85 psig in order for slurry to be transported through pretreatment reactor coil 16, flashing is prevented. Furthermore, as an additional safeguard against flashing within heat recovery process 88, preferably no preheating of dilute stillage 35 and fiber 24 within conveyor 23 occurs in order to avoid flashing of the liquid water contained with dilute stillage 35 stream. For this reason, preheating of the incoming untreated slurry 70 preferably occurs for the first time in direct contact condenser 22. In preferred embodiments of the present invention, flashing only occurs within a flash cooler-direct contact condenser unit.

Figure 2:
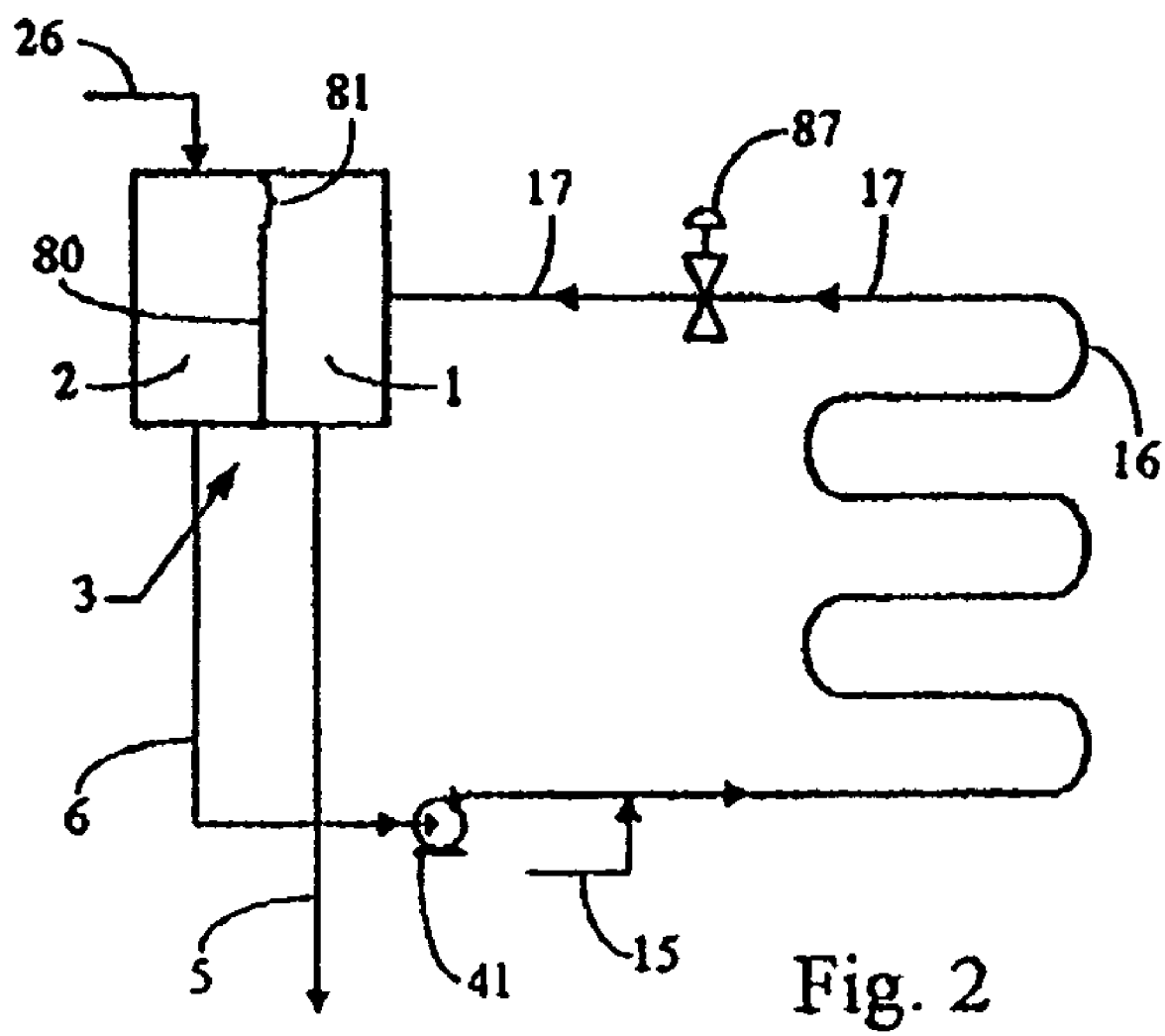
FIG. 2 is a heat recovery vessel having a flash cooler side and a direct contact condenser side.

In another example, the required flashing and condensing of vapors for heat recovery may occur within one vessel. FIG. 2 illustrates a cross-sectional view of vessel 3 having a flash cooler 1 on the right side and a direct contact condenser 2 on the left side of vessel 3. A plate 80 divides the flash cooler 1 from the direct contact condenser 2 such that incoming solids do not physically mix with the incoming liquid. After liquefied corn fiber slurry 17 emerges from the outlet of pretreatment reactor coil 16 at about 75 psig and 320° F., it enters into vessel 3 on the flash cooler 1 side. In response to a lower pressure in flash cooler 1, maintained by pressure control valve 87, a portion of the liquefied corn fiber slurry flashes into a vapor. Clearance 81 between the top edge of plate 80 and the top of vessel 3 allows the vapor to diffuse to the direct contact condenser side 2 of vessel 3. As shown, as flashed vapors diffuse to the direct contact condenser side 2, it contacts untreated slurry 26. Upon contact, flashed vapors condense onto the surface of untreated slurry 26. The absorption of the latent heat of the condensed vapors by untreated slurry 26 causes the temperature of the untreated slurry 26 to increase. Unflashed liquid slurry 5 discharges from the bottom of vessel 3 to be further cooled within another vessel (not shown) having both a flash cooler side and a direct contact condenser side. Untreated solids 26 exit the direct contact condenser 2 side as stream 6. Stream 6 enters the inlet of pulp pump 41. Pulp pump 41 pressurizes and transports stream 6 towards pretreatment reactor coil 16. Prior to entering pretreatment reactor coil 16, stream 6 is elevated to the final pretreatment temperature of about 320° F. with direct steam injection using direct injection 15.

In another example, multiple flash cooler-direct contact condenser units may be utilized to incrementally recover the process heat inputted into a heat recovery process, thereby minimizing side reactions which form degradation products. Such incremental heat recovery may involve gradually flashing vapors from the corn fiber liquid slurry in order to prevent autohydrolysis and degradation compounds formed within the liquid slurry. The degradation compounds may inhibit subsequent fermentation of the glucose derived from glucans or xylose derived from xylans to ethanol. The degradation products are formed in the liquid slurry when the amount of flashed vapors is sufficiently high to cool the corn fiber liquid slurry to the final processing temperature of about 212° F. in one flash vaporization.

Figure 3:
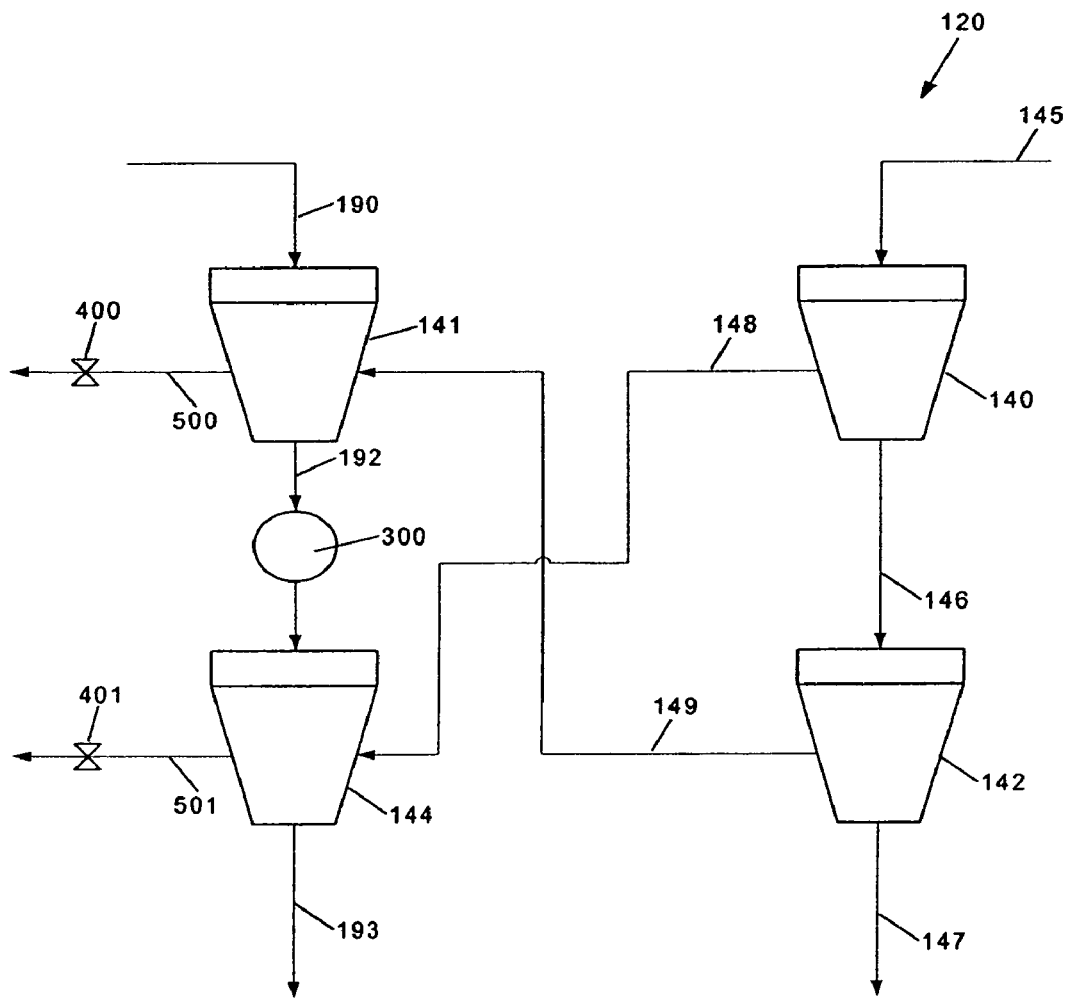
FIG. 3 is a counter-current heat recovery system of the present invention having multiple heat recovery stages.

FIG. 3 illustrates a pretreatment process 120 in which multiple flash cooler-direct contact condenser units are utilized to incrementally decrease the temperature of a pretreated corn fiber stream in order to minimize formation of degradation products. In particular, FIG. 3 displays a first flash cooler 140 connected to a first direct contact condenser 144 and a second flash cooler 142 connected to a second direct contact condenser 141. The pressures in flash coolers 140 and 142 are above atmospheric pressure but below the pressure of pretreatment reactor coil 16 (not shown). Outlet lines 500 and 501 from direct contact condensers 141 and 144, respectively, are provided with pressure control valves 400 and 401 so that flashed vapors that have not condensed may be removed from these condensers. Pump 300 ensures flow from first direct contact condenser 141 to second direct contact condenser 144.

The following example of the operation of a multi-staged flash cooler-direct contact condenser heat recovery system is illustrative and not limiting in nature. All operating parameters of FIG. 3 are based on the calculated values of Table 2. As shown in FIG. 3, liquid corn fiber slurry 145 exits pretreatment reactor coil (not shown) at about 320° F. and 75 psig and enters a first flash cooler 140. Upon entering the first flash cooler 140, a portion of the liquid corn fiber slurry 145 flash vaporizes in response to the lower pressure. Because flashed vapors are in equilibrium with the unflashed liquid corn fiber slurry, both the flashed vapors 148 and unflashed liquid corn fiber slurry 146 exit first flash cooler 140 at about 270° F. Unflashed liquid corn fiber slurry exits first flash cooler 140 as stream 146. Stream 146 enters second flash cooler 142. Second flash cooler 142 is maintained at a pressure less than the vapor pressure of the liquid slurry stream 146 at about 270° F. Upon entering second flash cooler 142, a portion of stream 146 flash vaporizes in response to lower the pressure of second flash cooler 142. Because flashed vapors are in equilibrium with the unflashed liquid corn fiber slurry, both the flashed vapors 149 and unflashed liquid corn fiber slurry 147 exit second flash cooler 142 at about 219° F.

Unflashed liquid corn fiber slurry exits first flash cooler 140 as stream 146 and enters second flash cooler 142 where it is further cooled by flash vaporization to about 219° F. By incrementally cooling incoming liquid corn fiber slurry 145 from about 320° F. to 270° F. to 219° F. to 212° F., side reactions that produce degradation products are avoided thereby allowing successful enzymatic hydrolysis to glucose and subsequent fermentation to ethanol.

As shown in FIG. 3, flashed vapors from second flash cooler 142 exit as stream 149 at about 219° F., being in thermal equilibrium with stream 147. Flashed vapors from first flash cooler 140 exit as stream 148. Stream 149 enters first direct contact condenser 141 at about 219° F. and contacts incoming untreated slurry stream 190, having a temperature of about 164° F. The temperature difference enables heat to be exchanged from stream 149 to slurry stream 190 via absorption of the latent heat of stream 149. Absorption of latent heat by slurry stream 190 causes vapors to condense. Heated slurry stream now leaves first direct contact condenser 141 as stream 192, having a temperature of about 214° F. Because the pressure in first direct contact condenser 141 is less than the pressure in second direct contact condenser 144, pump 300 enables stream 192 to flow towards second direct contact condenser 144. Hence, stream 192 enters second direct contact condenser 144 via pump 300 where it contacts incoming flashed vapor stream 148, having a temperature of about 270° F. Similar to the previous stage, a temperature difference enables heat to be exchanged from stream 148 to slurry stream 192 in second direct contact condenser 144. Heat transfer occurs via absorption of the latent heat of stream 148, thereby causing vapors to condense onto slurry stream 192. Heated slurry stream now leaves direct contact condenser 144 as stream 193, having a temperature of about 264° F. Direct steam injection with direct injection heater 15 (FIG. 1) can supply the remaining heat required for pretreatment prior to stream 193 entering pretreatment reactor coil 16 (FIG. 1).

Table 2 below provides an expected temperature profile of the 2-stage countercurrent cooler-direct contact condenser heat recovery system 120 shown in FIG. 3. The expected temperatures were calculated from a thermal energy balance of the process using Microsoft® Excel. Inlet and outlet temperatures from each of the flash coolers 140, 142 and direct contact condensers 141, 144 are provided on the basis of a temperature range of pretreated slurry streams 145 exiting pretreatment reactor coil 16 (labeled as Coil Temp of Stream 145 in Table 2) and incoming untreated slurry stream 190 (labeled as Supply Temp of Stream 190 in Table 2) entering heat recovery system 120. All streams in Table 2 refer to those streams designated in FIG. 3. The temperature profile of heat recovery system 120 is shown below under Pilot Conditions. However, it should be understood that the heat recovery system 120 encompasses a wide range of temperature profiles. Additionally, the temperature profile applies to not only the corn fiber pretreatment process currently being discussed, but also a variety of other lignocellulosic and fiber materials.

TABLE 2

| 2-STAGE SYSTEM Coil Temp of Stream #145 | | | | | |
|---|---|---|---|---|---|
| | 248 F. | 284 F. | 320 F. | 356 F. | 392 F. |
| Supply Temp of Stream 190, F. 68 F. Flash Cooler-140 | | | | | |
| Stream 146 Temp, F. = | 190 | 214 | 237 | 262 | 286 |
| Stream 148 Temp, F. = | 190 | 214 | 237 | 262 | 286 |
| Flash Cooler-142 | | | | | |
| Stream 146 Temp, F. = | 190 | 214 | 237 | 262 | 286 |
| Stream 147 Temp, F. = | 131 | 144 | 156 | 167 | 180 |
| Stream 149 Temp, F. = | 131 | 144 | 156 | 167 | 180 |
| Condenser-141 | | | | | |
| Stream 192 Temp, F. = | 126 | 138 | 151 | 162 | 174 |

TABLE 2-continued

2-STAGE SYSTEM
Coil Temp of Stream #145

|  | 248 F. | 284 F. | 320 F. | 356 F. | 392 F. |
|---|---|---|---|---|---|
| Condenser-144 | | | | | |
| Stream 193 Temp, F. = 104 F. | 185 | 208 | 232 | 257 | 280 |
| Flash Cooler-140 | | | | | |
| Stream 146 Temp, F. = | 201 | 226 | 250 | 273 | 298 |
| Stream 148 Temp, F. = | 201 | 226 | 250 | 273 | 298 |
| Flash Cooler-142 | | | | | |
| Stream 146 Temp, F. = | 201 | 108 | 121 | 134 | 148 |
| Stream 147 Temp, F. = | 156 | 167 | 180 | 192 | 203 |
| Stream 149 Temp, F. = | 156 | 167 | 180 | 192 | 203 |
| Condenser-141 | | | | | |
| Stream 192 Temp, F. = | 66 | 72 | 79 | 86 | 92 |
| Condenser-144 | | | | | |
| Stream 193 Temp, F. = 140 F. | 196 | 221 | 244 | 268 | 293 |
| Flash Cooler-140 | | | | | |
| Stream 146 Temp, F. = | 214 | 237 | 262 | 286 | 309 |
| Stream 148 Temp, F. = | 214 | 237 | 262 | 286 | 309 |
| Flash Cooler-142 | | | | | |
| Stream 146 Temp, F. = | 214 | 237 | 262 | 286 | 309 |
| Stream 147 Temp, F. = | 180 | 192 | 203 | 216 | 228 |
| Stream 149 Temp, F. = | 180 | 192 | 203 | 216 | 228 |
| Condenser-141 | | | | | |
| Stream 192 Temp, F. = | 174 | 187 | 198 | 210 | 223 |
| Condenser-144 | | | | | |
| Stream 193 Temp, F. = | 208 | 232 | 257 | 280 | 304 |
| Fiber Conditions 163.5 F. | | | | | |
| Flash Cooler-140 | | | | | |
| Stream 146 Temp, F. = | | | 270 | | |
| Stream 148 Temp, F. = | | | 270 | | |
| Flash Cooler-142 | | | | | |
| Stream 146 Temp, F. = | | | 270 | | |
| Stream 147 Temp, F. = | | | 219 | | |
| Stream 149 Temp, F. = | | | 219 | | |
| Condenser-141 | | | | | |
| Stream 192 Temp, F. = | | | 214 | | |
| Condenser-144 | | | | | |
| Stream 193 Temp, F. = 176 F. | | | 264 | | |
| Flash Cooler-140 | | | | | |
| Stream 146 Temp, F. = | 226 | 250 | 273 | 298 | 322 |
| Stream 148 Temp, F. = | 226 | 250 | 273 | 298 | 322 |
| Flash Cooler-142 | | | | | |
| Stream 146 Temp, F. = | 226 | 250 | 273 | 298 | 322 |
| Stream 147 Temp, F. = | 203 | 216 | 228 | 239 | 252 |
| Stream 149 Temp, F. = | 203 | 216 | 228 | 239 | 252 |
| Condenser-141 | | | | | |
| Stream 192 Temp, F. = | 198 | 210 | 223 | 234 | 246 |
| Condenser-144 | | | | | |
| Stream 193 Temp, F. = 212 F. | 221 | 244 | 268 | 293 | 316 |
| Flash Cooler-140 | | | | | |
| Stream 146 Temp, F. = | 237 | 262 | 286 | 309 | 334 |
| Stream 148 Temp, F. = | 237 | 262 | 286 | 309 | 334 |
| Flash Cooler-142 | | | | | |
| Stream 146 Temp, F. = | 237 | 262 | 286 | 309 | 334 |
| Stream 147 Temp, F. = | 228 | 239 | 252 | 264 | 275 |
| Stream 149 Temp, F. = | 228 | 239 | 252 | 264 | 275 |
| Condenser-141 | | | | | |
| Stream 192 Temp, F. = | 223 | 234 | 246 | 259 | 270 |
| Condenser-144 | | | | | |
| Stream 193 Temp, F. = | 232 | 257 | 280 | 304 | 329 |

CALCULATED VALUES BASED ON ENERGY BALANCE

In the above-described multi-staged heat recovery system, each flash cooler is preferably paired with a corresponding direct contact condenser such that the flashed vapors, exiting a particular flash cooler and entering a corresponding direct contact condenser, have a greater temperature than the slurry entering the corresponding direct contact condenser. If each flash cooler is paired with a corresponding direct contact condenser in this manner, the untreated slurry will gain heat at each stage and the pretreated liquid slurry will lose heat at each stage.

As an alternative to having two heat recovery stages as shown in FIG. 3 and Table 2, it should be understood that multiple heat recovery stages may be utilized to achieve controlled incremental heating of the slurry and avoid degradation product formation within the liquefied slurry. However, such process benefits are preferably balanced with the capital and operating costs of additional heat recovery stages in order to determine the optimal number of flash coolers and direct contact condensers that should be used. As has been discussed, the multi-stage unit 120 of FIG. 3 may recuperate heat energy from other pretreated cellulosic materials, including corn stover, wheat straw, or wood chips. Because these types of materials require pretreatment temperatures of up to about 428 F, the pretreated material must be cooled from about 428 F to about 212 F. Such a large range temperature range would necessitate a multi-stage unit, as shown in FIG. 3, in order to incrementally cool the pretreated material and avoid formation of degradation products.

Figure 4:
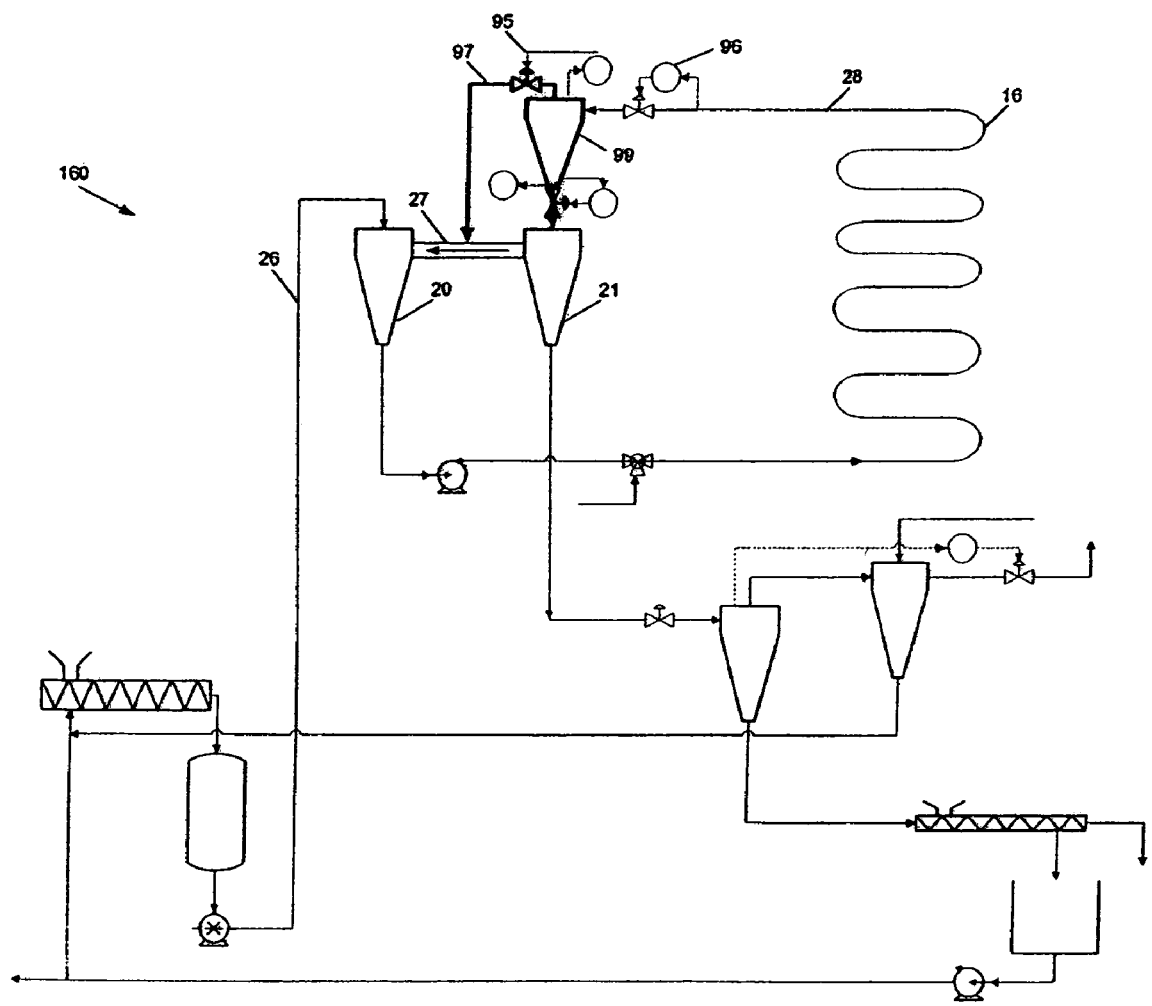
FIG. 4 is a modified multi-stage heat recovery system.

Another example of a multiple heat recovery process and system is shown in FIG. 4. In particular, a pre-cooler process 160 for recovering heat from pretreated slurry stream hot biomass stream 28 in a stage-wise manner such that hydrolysis and degradation products are minimized is shown. An additional flash cooler 99 may be placed upstream of the flash cooler 21—direct contact condenser 20 unit. As described in FIG. 1, pretreated slurry hot biomass stream 28 is a high energy stream upon undergoing pretreatment in pretreatment reactor coil 16. FIG. 4 shows that pressure control valve 96 maintains the pressure in pretreatment reactor coil 16 at a desired set point. Upon exiting pretreatment reactor coil 16, pretreated slurry stream hot biomass stream 28 enters flash cooler 99 where a portion of it flash vaporizes and cools to a desired first step cooling temperature, which is controlled by regulating the flash pressure within flash cooler 99 through pressure control valve 95. The flashed vapors exit flash cooler 99 as stream 97. Flashed vapor stream 97 may thereafter mixed with stream 27, which is a stream of flashed vapors exiting flash cooler 21. Flashed vapor streams 97 and 27 collectively enter direct contact condenser 20 where it will come into contact, and thereby heat untreated stream 26, as mentioned in the foregoing discussion with respect to FIG. 1. Remaining solids and liquids exit the bottom of pre-cooler flash system 99, and enter flash cooler 21, where it will continue with the heat recovery processing as described in FIG. 1.

Because the operating pressure of flash cooler 99 is greater than the operating pressures of flash cooler 21 and direct contact condenser 20, vapor 97 and slurry materials from flash cooler 99 automatically flow into direct contact condenser 20 and flash cooler 21, respectively. Consequently, no pumping is required.

Additionally, heat recovery by pre-cooler process 160 provides a 2-step stage-wise reduction in temperature. The portion of the corn slurry hot biomass stream 28 that does not flash vaporize in the first flash cooler 99 may be fed to the second flash cooler 21 where an additional portion is flash cooled as stream 27. Hence, all of the system heat energy in pre-cooler process 160 is contained within streams 97 and 27, which are both channeled into direct contact condenser 20 to provide effective heating of untreated slurry stream 26.

The above Figures and disclosure are intended to be illustrative and not exhaustive. This description will suggest many variations and alternatives to one of ordinary skill in the art. All such variations and alternatives are intended to be encompassed within the scope of the attached claims. Those familiar with the art may recognize other equivalents to the specific embodiments described herein which equivalents are also intended to be encompassed by the attached claims. For example, the invention has been described in the context of recovering heat from a pretreatment process involving a liquefied corn fiber slurry. Application of the principles of the invention to recover heat from pretreatment of other cellulosic materials as well as other chemical processes in general are within the ordinary skill in the art and are intended to be encompassed within the scope of the attached claims. Moreover, in view of the present disclosure, a wide variety of flash coolers and direct contact condensers will become apparent to one of ordinary skill in the art.

The invention claimed is:

1. A method for transferring heat from a first hot biomass to a cold biomass, comprising the steps of:
   (a) providing a heat recovery system, comprising:
      a flash cooler; and
      a direct contact condenser;
   (b) providing a first hot biomass stream characterized by a first temperature and a first pressure, and having a liquid with a first saturation water vapor pressure at the first temperature;
   (c) introducing the first hot biomass stream into the flash cooler, the flash cooler having a second pressure, where the second pressure is less than the first saturation water vapor pressure and the second pressure is less than the first pressure;
   (d) flashing a liquid portion of the first hot biomass to form a first hot biomass vapor and an unflashed first hot biomass component, the first hot biomass vapor having a second temperature that is less than the first temperature;
   (e) removing the first hot biomass vapor from the flash cooler;
   (f) transferring the first hot biomass vapor into the direct contact condenser;
   (g) introducing a cold biomass into the direct contact condenser, the cold biomass having a third temperature, where the third temperature is less than the second temperature of the first hot biomass vapor; and
   (h) contacting the first hot biomass vapor with the cold biomass for a time sufficient to transfer heat from the first hot biomass vapor to the cold biomass, wherein the first hot biomass vapor condenses onto the cold biomass, wherein the transfer of heat to the cold biomass increases the temperature of the cold biomass to form a heated cold biomass having a fourth temperature, where the fourth temperature is greater than the third temperature.

2. The method of claim 1, wherein contacting the first hot biomass vapor with the cold biomass comprises countercurrent flow of the vapor and the cold biomass into the direct contact condenser.

3. The method of claim 1 further comprising the steps of:
   (i) withdrawing the heated cold biomass from the direct contact condenser,
   (j) increasing the temperature of the heated cold biomass to the first temperature of the first hot biomass stream; and
   (k) pretreating the heated cold biomass at the first temperature to form a second hot biomass stream.

4. The method of claim 3 wherein the first temperature is about 320° F.

5. The method of claim 3 wherein the temperature of the heated cold biomass is increased to the first temperature of the first hot biomass comprises direct steam injection heating of the heated cold biomass.

6. The method of claim 1 wherein the first hot biomass stream comprises a pretreated cellulosic liquid slurry.

7. The method of claim 6 wherein the first pressure is between about 70 to 90 psig.

8. The method of claim 6 wherein the third temperature is about 212° F.

9. The method of claim 6 wherein the fourth temperature is about 264° F.

10. The method of claim 1 wherein the first hot biomass stream is selected from the group consisting of corn fiber and corn stover.

11. The method of claim 10 wherein the first temperature is about 320° F.

12. The method of claim 1 wherein the second temperature of the first hot biomass vapor is about 264° F.

13. The method of clam 1 comprising recycling the unflashed first hot biomass component comprising the steps of:
   (i) withdrawing the unflashed first hot biomass component from the flash cooler, where the unflashed first hot biomass component has a temperature that is less than the first temperature;
   (j) increasing the temperature of the unflashed first hot biomass component to the first temperature of the first hot biomass stream; and
   (k) pretreating the unflashed first hot biomass component heated to the first temperature to form a third hot biomass stream.

14. The method of claim 1 where the first pressure of the first hot biomass stream is at least about 1% greater than the first saturation water vapor pressure.

15. The method of claim 1, where the flash cooler is a first flash cooler and the direct contact condenser is a first direct contact condenser, and where the method further comprising the steps of:
   (a) providing a second flash cooler positioned to receive the unflashed first hot biomass component from the first flash cooler; and a second direct contact condenser positioned to receive a second hot biomass vapor from the second flash cooler;

(b) introducing the unflashed first hot biomass component into the second flash cooler, the unflashed first hot biomass component having the second temperature, the second flash cooler having a pressure less than second the pressure of the first flash cooler;

(c) flashing a liquid portion of the unflashed first hot biomass component to form the second hot biomass vapor and an unflashed second hot biomass component, where the second hot biomass vapor has a fifth temperature, where the fifth temperature is less than the second temperature;

(d) transferring the second hot biomass vapor into the second direct contact condenser;

(e) introducing a second cold biomass having a sixth temperature, where the sixth temperature is lower than the fifth temperature of the second hot biomass vapor;

(f) contacting the second cold biomass with the second hot biomass vapor in the second direct contact condenser for a time sufficient to transfer heat from the second hot biomass vapor to the second cold biomass, wherein the second hot biomass vapor condenses onto the surface of the second cold biomass, wherein the transfer of heat to the second cold biomass increases the temperature of the second cold biomass.

16. The method of claim 15 further comprising the step of (g) providing a stand alone direct contact condenser and transferring a remaining uncondensed second hot biomass vapor from the second direct contact condenser to the stand alone direct contact condenser, where the remaining uncondensed second hot biomass vapor has a seventh temperature, where the seventh temperature is less than the fifth temperature of the second hot biomass vapor;

(h) introducing a third cold biomass material into the stand alone direct contact condenser having a temperature less than the seventh temperature of the remaining uncondensed second hot biomass vapor; and (i) contacting the third cold biomass material with the remaining uncondensed second hot biomass vapor in the stand alone direct contact condenser for a time sufficient to transfer heat from the remaining uncondensed second hot biomass vapor to the third cold biomass material, wherein absorption of the heat by the material condenses the remaining uncondensed second hot biomass vapor onto the surface of the material.

17. The method of claim 16 where the third cold biomass material comprises stillage.

18. The method of claim 15 further comprising the steps of:

(g) removing the unflashed second hot biomass component from the second flash cooler;

(h) providing a centrifuge and introducing the unflashed second hot biomass component into the centrifuge, where the centrifuge separates the unflashed second hot biomass component into a solid cake and a liquid product.

19. A method for controlled and incremental transfer of heat from a hot biomass to a cold biomass, comprising the steps of:

(a) providing a heat recovery system comprising a plurality of flash coolers configured in series to permit the flow of an unflashed hot biomass component from a first flash cooler to one or more downstream flash coolers and a plurality of direct contact condensers configured in series to permit the flow of a flashed hot biomass from a first direct contact condenser to one or more downstream direct contact condensers, wherein each of the plurality of flash coolers is operably connected to a corresponding direct contact condenser;

(b) generating an unflashed hot biomass component in the first flash cooler and subsequently sequentially passing the hot biomass through the plurality of flash coolers;

(c) heating a cold biomass and sequentially passing the cold biomass through the plurality of direct contact condensers;

(d) flashing a liquid portion of the hot biomass into a vapor within each of the plurality of flash coolers that the hot biomass passes through;

(e) removing the vapor from each of the plurality of flash coolers;

(f) transferring the vapor from each of the plurality of flash coolers to the corresponding direct contact condenser;

(g) contacting the vapor with the cold biomass in each of the corresponding direct contact condensers the cold biomass sequentially passes through; and (h) condensing the vapor onto a surface of the cold biomass, thereby heating the cold biomass sequentially passing through each of the corresponding direct contact condensers.

20. The method of claim 19 for the controlled and incremental transfer of heat from a hot biomass to a cold biomass where undesirable formation of degradation products in the unflashed hot biomass component is minimized.

21. A method for controlled and incremental transfer of heat from a hot biomass stream to a cold biomass stream, comprising the steps of:

(a) providing a heat recovery system, comprising:
a first flash cooler;
a second flash cooler; and
a direct contact condenser;

(b) providing the hot biomass stream characterized by a first temperature and a first pressure, and having a liquid with a first saturation water vapor pressure at the first temperature (c) introducing the hot biomass stream into the first flash cooler, the first flash cooler having a second pressure, where the second pressure is less than the first saturation water vapor pressure and the second pressure is less than the first pressure;

(d) flashing a portion of the liquid of the first hot biomass stream to form a first hot biomass vapor and an unflashed first hot biomass component, the first hot biomass vapor having a second temperature that is less than the first temperature;

(e) removing the first hot biomass vapor from the first flash cooler;

(f) transferring the unflashed first hot biomass component having the second temperature into the second flash cooler;

(g) flashing a liquid portion of the unflashed first hot biomass component to form a second hot biomass vapor and an unflashed second hot biomass component, the second hot biomass vapor having a third temperature less than the second temperature;

(h) transferring the first hot biomass vapor from the first flash cooler and the second hot biomass vapor from the second flash cooler into the direct contact condenser;

(i) introducing a cold biomass stream into the direct contact condenser, the cold biomass having a fourth temperature, where the fourth temperature is less than the second temperature of the first hot biomass vapor and the third temperature of the second hot biomass vapor; and (j) contacting the first hot biomass vapor and the second hot biomass vapor with the cold biomass for a time sufficient to transfer heat from the first hot biomass vapor and heat from the second hot biomass vapor to the cold biomass, wherein absorption of the heats from the first and second hot biomass vapors by the cold biomass condenses the first and second hot biomass vapors onto the surface of the cold biomass, wherein the transfer of heat to the cold biomass increases the fourth temperature of the cold biomass to form a heated cold biomass having a fifth temperature, wherein the fifth temperature of the heated cold biomass is greater than the fourth temperature of the cold biomass.

22. The method of claim 21, wherein the controlled and incremental transfer of heat from the hot biomass stream to the cold biomass stream reduces formation of sugar degradation products.

* * * * *

UNITED STATES PATENT AND TRADEMARK OFFICE
CERTIFICATE OF CORRECTION

PATENT NO. : 7,566,383 B2  Page 1 of 1
APPLICATION NO. : 11/156242
DATED : July 28, 2009
INVENTOR(S) : Rollo J. Everett et al.

It is certified that error appears in the above-identified patent and that said Letters Patent is hereby corrected as shown below:

Title Page; should read;

Assignee:

Purdue Research Foundation, West Lafayette, Indiana (US)

Aventine Renewable Energy, Inc., Pekin, Illinois (US)

Signed and Sealed this

Tenth Day of November, 2009

David J. Kappos
*Director of the United States Patent and Trademark Office*